UNITED STATES PATENT OFFICE.

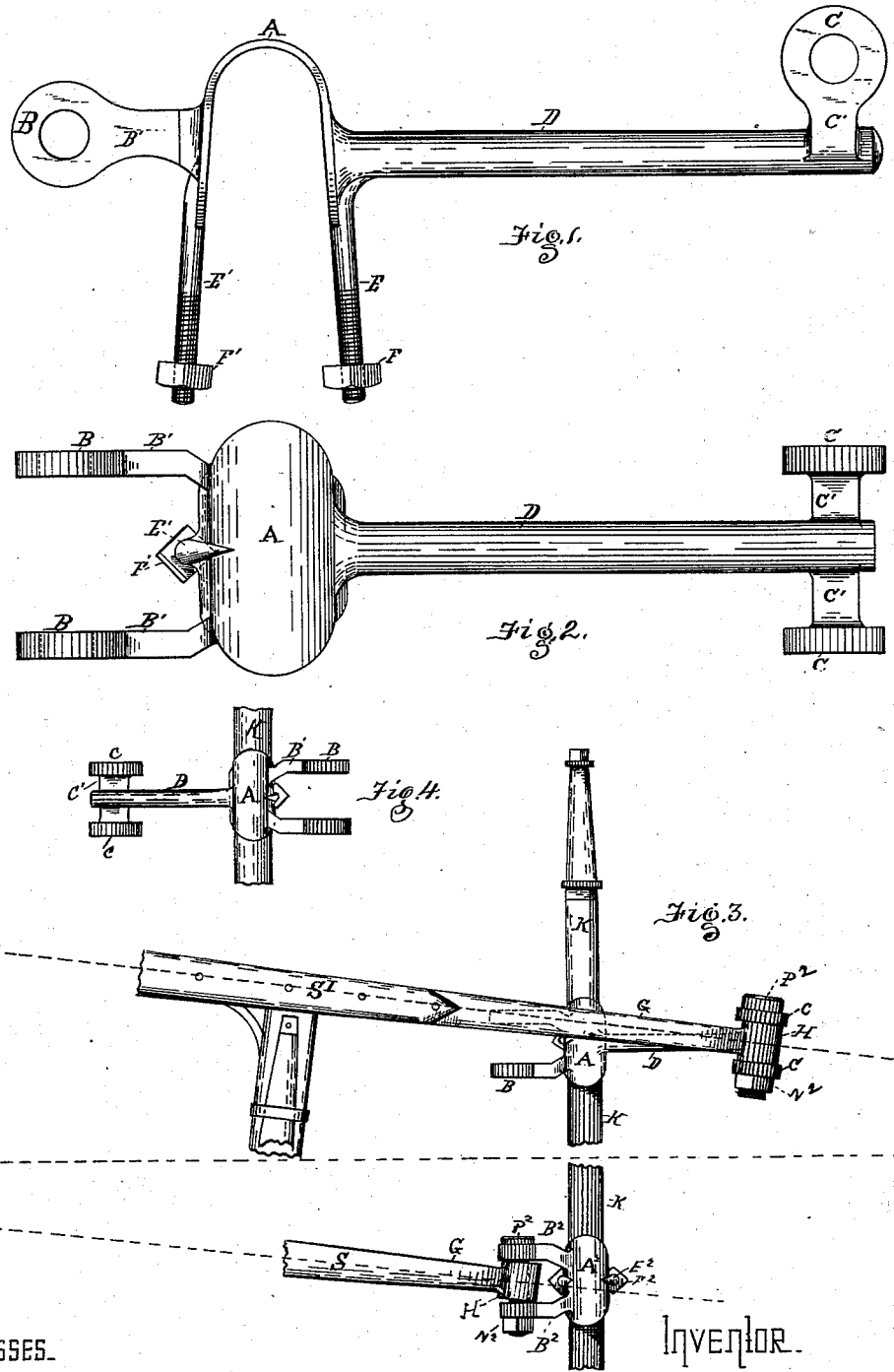

WILLIAM W. RANKIN, OF PITTSBURG, PENNSYLVANIA.

VEHICLE-SHAFT COUPLING.

SPECIFICATION forming part of Letters Patent No. 406,536, dated July 9, 1889.

Application filed October 25, 1888. Serial No. 289,108. (No model.)

*To all whom it may concern:*

Be it known that I, WILLIAM W. RANKIN, residing at Pittsburg, in the county of Allegheny and State of Pennsylvania, have invented or discovered a certain new and useful Improvement in Vehicle-Shaft Couplings, of which improvement the following is a specification.

The purpose of my invention is to provide a simple attachment for one-horse vehicles, by means of which the shafts will be so angled that the horse will be thrown from the center to the side of the roadway.

As all know, it is frequently desirable to have the horse move on the side instead of the center of the street, car-track, or road. For example, when a cable road with central conduit has been laid in a street, many horses refuse to travel on the conduit, while those who do frequently slip and lose shoes. Again, on country roads in heavy weather there is a central ridge of dirt or snow thrown up, which makes traveling very annoying when the horse is attached in the usual manner to the vehicle. By my invention the horse can be quickly shifted from the middle to the side of the road, as will be more fully explained below.

In the accompanying drawings, which make part of this specification, Figure 1 is a side elevation of the common shaft-coupling and clip with my improvement attached. Fig. 2 is a plan view of the same. Fig. 3 is a plan view of one shaft coupled to my improvement and the other shaft coupled in the usual manner. Fig. 4 is a plan view of a shaft as it would be coupled to my improvement on a spring-wagon.

In Figs. 1 and 2, B is the eye of a shaft-coupling; B', the lug; A, the strap of the clip; E E', the tangs of the clip; F F', the nuts which secure the yoke. (Not shown, as it does not concern the present invention.) In the same figures D is my improved arm, preferably made a part of the same forging with the clip, and provided with two eyes C C, forged to the arm D by lugs C' C'. This arm D, for a vehicle of medium size, would be about five inches long, and if made round would be about five-eighths inch in diameter; but I do not confine myself to any particular size.

In the lower part of Fig. 3 I show the shaft S, having iron cap G and shaft-eye H, coupled in eyes $B^2$ $B^2$ and secured by shaft-bolt $P^2$ and nut $N^2$. $A^2$ is the clip, $E^2$ the tang, and $F^2$ the nut securing the yoke on the axle K. The upper part of Fig. 3 shows the other shaft S' removed from the eyes B B (where it would rest when the horse is to travel in the center of the road) and carried back and inserted between the eyes C C. The same bolt $P^2$ and nut $N^2$ which were used on the front attachment are again used to secure the shaft-eye H in place. Fig. 4 shows the arm D extending forward from the axle—a construction which would be found necessary on many spring-vehicles to prevent the cross-piece striking the springs, as it would if the arm D were attached rearward, as shown in Fig. 3. Otherwise the construction of Fig. 4 is the same as that of Fig. 3. This shifting of the shaft from its usual position, either backward or forward, is a very simple operation, and no additional devices are required to be attached when the shifting is done, as the arm D, with its coupling-eyes C C, will form a permanent part of the rig.

It will be noticed that in Fig. 3 the arm D is shown slightly bent, so that the three eyes may be in line for the passage of the bolt. In Fig. 4 the arm D is shown as originally forged before being bent.

It is apparent that this drawing back or advancing one shaft by the use of my extension will throw the points of the shafts to one side and accomplish my purpose. I find that an arm of the stated length of five inches will give an average throw to the points of shafts of from twelve to eighteen inches. My improved arm may obviously be attached to either shaft, as found expedient.

Although I prefer to make coupling, clip, and arm all in one forging, as shown in the various figures, the arm may be secured to the axle or form an extension of the yoke commonly used.

Having fully described my invention, I claim—

In combination with an axle and a pair of shafts, an arm extending from said axle substantially horizontally, and having coupling-eyes to receive one shaft, the other shaft being secured to the axle in the usual manner for the purpose of throwing the points of the shaft to one side, all substantially as and for the purposes set forth.

In testimony whereof I have hereunto set my hand.

WILLIAM W. RANKIN.

Witnesses:
 WM. L. PIERCE,
 WILLIAM BEAL.